Figure 1:
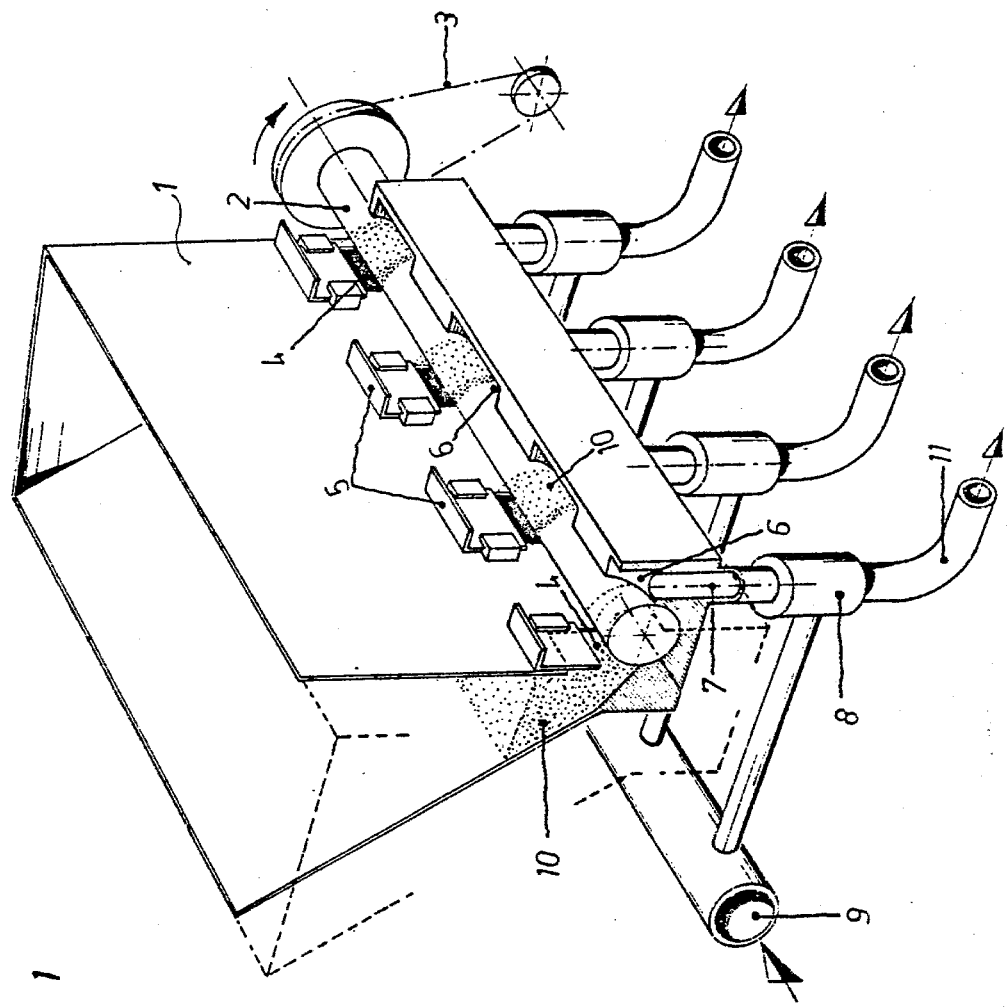

United States Patent [19]

Mueller

[11] 4,257,334
[45] Mar. 24, 1981

[54] APPARATUS AND METHOD FOR REGULATING THE DISTRIBUTION OF GRANULATE

[75] Inventor: Walter Mueller, Krumbach, Fed. Rep. of Germany

[73] Assignee: Lingl Corporation, Paris, Tenn.

[21] Appl. No.: 30,934

[22] Filed: Apr. 17, 1979

[30] Foreign Application Priority Data

May 18, 1978 [DE] Fed. Rep. of Germany ....... 2821632

[51] Int. Cl.³ .............................................. F23K 3/02
[52] U.S. Cl. ................................. 110/104 R; 110/347; 222/317
[58] Field of Search .................. 110/104 R, 105, 327, 110/347; 222/314, 317, 330, 414; 406/52, 70, 123, 128, 130, 132

[56] References Cited

U.S. PATENT DOCUMENTS

| 111,615 | 1871 | Crampton ........................ 406/70 X |
| 663,902 | 12/1900 | Hutchison ........................ 222/317 |
| 844,124 | 2/1907 | Halliday ........................ 222/317 |
| 2,055,331 | 9/1936 | Bredtschneider ............... 110/104 R |
| 2,737,319 | 3/1956 | Rayburn . |
| 3,616,972 | 11/1971 | Christy ........................ 222/317 |
| 3,788,529 | 1/1974 | Christy ........................ 222/314 |
| 4,090,645 | 5/1978 | Mowbray ........................ 406/70 |
| 4,092,094 | 5/1978 | Lingl, Jr. . |
| 4,131,072 | 12/1978 | Lingl, Jr. et al. . |

FOREIGN PATENT DOCUMENTS

| 1253368 | 1/1961 | France . |
| 581570 | 11/1976 | Switzerland . |
| 294443 | 7/1928 | United Kingdom . |
| 676209 | 7/1952 | United Kingdom . |
| 1150370 | 4/1969 | United Kingdom . |
| 1322466 | 7/1973 | United Kingdom . |
| 1505068 | 3/1978 | United Kingdom . |

*Primary Examiner*—Charles A. Ruehl
*Attorney, Agent, or Firm*—Larry S. Nixon

[57] ABSTRACT

Apparatus and method for the independently regulated distribution of granulate to a plurality of points of consumption. A container (1), at least partially filled with granulate (10) to be distributed, includes a plurality of container apertures (4) each covered by a slide (5). A rotatable shaft (2) longitudinally disposed in front of apertures (4) is driven by a drive (3) at controllable rates. Granulate (10) adheres by friction to the surface of shaft (2) when rotated and is conveyed via the shaft to a plurality of troughs (6) where the granulate is collected. The granulate then flows through feed tubes (7) to air injectors (8) where it is entrained into an airstream and propelled to a plurality of points of consumption. The method according to the present invention includes the steps of: Storing granulate in a container having slide controlled apertures; rotating a shaft in the vicinity of these apertures; conveying granulate along the surface of the shaft; receiving the conveyed granulate into a plurality of troughs, each trough corresponding to an aperture; and conducting the granulate at each trough through an associated air injector to distribution pipes for conduction to a plurality of points of consumption.

17 Claims, 1 Drawing Figure

APPARATUS AND METHOD FOR REGULATING THE DISTRIBUTION OF GRANULATE

TECHNICAL FIELD

This invention relates to the distribution of airborne granular material such as pulverized coal to a plurality of points of consumption such as to multiple furnace burners. More specifically, this invention relates to the independently regulated distribution of airborne granular material to each of such plural points.

BACKGROUND ART

Various systems for the distribution of granular material such as pulverized coal for the feeding of a plurality of furnace burners are known but all offer certain disadvantages in their use. One such known system utilizes a circular housing having a plurality of openings therein. A granular material air mixture is distributed through these openings by centrifugal force. A particular difficulty with this type of system is that the quantity of airborne granular material distributed through each opening cannot be individually regulated. Equal quantities of granular material are fed through all openings.

Another known airborne granular material distribution system includes a knee-shape distributor pipe in an annular housing. An outside ring is turned such that the end of the distributor pipe through which granulate flows is stopped for variable and controllable lengths of time at each of a plurality of apertures in sequence. By controlling the time during which the end of the distributor pipe is aligned with a specific opening, the amount of granulate flowing through each opening is controlled. The major disadvantage of such an arrangement is that individual points of consumption are fed only intermittantly and any change of the tarry time at a particular opening automatically results in variation in the relative feed time of another point of consumption.

In another prior art granulate distribution system, the granulate is distributed to a plurality of points of consumption by means of pulses of controllable length. A disadvantage of this type of system is the intermittent delivery and consequent effects on the operation of the various points of consumption. Certain types of consumers must be fed continuously while the rate of feed is regulated within a predetermined range.

Other airborne granular material distributing systems control the flow rate of the granulate by changing various parameters relating to the airflow at distributor outlets. However, the distribution in such systems is highly dependent upon the condition of the granulate itself. For example, changes in moisture, particle size, and particle friction result in changes in the feed rate thereby making such system somewhat unreliable under certain conditions.

DISCLOSURE OF INVENTION

In accordance with the present invention, there is provided a granulate distribution apparatus and method for distributing granulate to a plurality of points of consumption overcoming these difficulties inherent in the operation of currently available systems. The apparatus and method of the present invention provides for the independent regulation of the flow rate of granular material to each point of a plurality of points of consumption, while allowing for continuous feed of the granular material to all such points of consumption, or as many points of consumption as desired.

The apparatus and method according to the present invention provide a means for mechanically feeding a solid fuel such as pulverized coal to a burner or plurality of burners in such a manner that temperature control is as accurate as with the burning of gases or liquid fuels.

Either one burner or a plurality of burners can be supplied with pulverized coal from one storage container. If multiple burners are being used, each burner is individually controllable. It is now possible, utilizing the present invention to maintain a multiple burner coal furnace system with individual burner control and centrally located metering and feeding adjustment.

An exemplary apparatus for the independently regulated distribution of granular material to a plurality of points of consumption includes:

a container having a plurality of ports;

slides for controlling the size of these ports;

a rotatable shaft positioned laterally along these ports and positioned close enough to these ports so as to convey granular material flowing through these ports; and troughs corresponding to each port positioned so as to gather granular material conveyed by the rotating shaft from the corresponding port and a plurality of air injectors, one such injector associated with each trough for entraining the granular material conveyed over the shaft into an air stream for distribution to points of consumption.

The rotatable shaft in this exemplary embodiment extends parallel to the bottom longitudinal edge of the container and is rotated such that the apex of the shaft rotates away from the container. Granular material appearing at the ports by gravity feed is stopped by the presence of the shaft when the shaft is not rotating and is conveyed by the shaft when it is rotating by the action of friction between the particles of granulate and the surface of the shaft. The rate of granular material flow is determined by the speed of rotation of the shaft and the size of the individual container ports. By adjusting the slides associated with each container port, the relative granular material flow rates to individual points of consumption can be controlled.

An exemplary method for the independently regulated distribution of granular material to a plurality of points of consumption is also disclosed and includes the following steps:

storing granular material to be distributed within a container having a plurality of ports therein, the size of these ports being controllable;

rotating a shaft in the vicinity of these ports;

conveying granular material along the surface of the shaft;

receiving the granular material conveyed over the surface of the shaft into a plurality of troughs corresponding to the plurality of container ports; and conducting the granular material at each such trough through an air injection mechanism to a distribution pipe for conduction to a plurality of points of consumption.

According to this method, the rate of delivery of the granular material is determined by the position of the shaft with respect to the container ports, its rate of rotation and the absolute and relative sizes of the container ports themselves.

By utilizing apparatus and method according to the present invention, the rate of delivery of granulate to each of a plurality of points of consumption can be controlled. The overall magnitude of granular material flow can be determined by controlling the rate of rotation of the shaft and the relative rates of granular material flow can be adjusted by altering the relative sizes of the ports in the container. Large or small quantities delivered to the various points of consumption being accurately controlled. Delivery of granular material can be either continuous or intermittent by controlling the rotation of the shaft, i.e. the rotation of the shaft can be completely stopped at desired intervals. Another feature of the present invention is that the influence of the condition of the granular material (its moisture content, etc.) is minimal on the distribution rates of the granular material to the various points of consumption.

The apparatus and method according to the present invention are particularly well suited for the mechanical, controlled metering and feeding of pulverized coal into an air stream transporting the coal to a burner designed to operate at a controlled or evenly maintained temperature.

Using this method for precisely regulating the amount of coal induced into the air stream, burner temperature can be controlled. The availability of the system and method providing the temperature controlled burning of airborne granular material, such as coal, allows burners previously operating on gases or liquid fuels to be operated on pulverized coal.

BRIEF DESCRIPTION OF THE DRAWINGS

Many of the attendant advantages of the present invention will be readily apparent as the invention becomes better understood by reference to following detailed description and the appended claims, when considered in conjunction with the accompanying drawings, wherein:

The FIGURE is a cutaway perspective view of the airborne granular material distribution apparatus according to the present invention.

BEST MODE FOR CARRYING OUT THE INVENTION

Referring to the FIGURE wherein like reference numerals designate like or corresponding parts throughout, there is a cutaway perspective view of the granular material distribution apparatus according to the present invention. There is shown a container 1 which is, in essence, a storage bin partially filled with granular material 10 to be distributed. Located near the bottom of container 1 are a plurality of container ports 4. A slide 5 is mounted to container 1 at each container port 4 so that the size of each port is individually controllable by the action of its associated slide. Container 1 is oriented such that gravity forces granular material 10 within the container to accumulate at container ports 4 and to flow therethrough unless blocked. Of course, for granular material to flow, container 1 must be filled to a level above the position of apertures 4.

A shaft 2, rotatably mounted, is longitudinally positioned adjacent to container 1 and parallel to container ports 4 and acts as a metering roller. The placement of shaft 2 with respect to container ports 4 is chosen such that the point of intersection of the angle of repose of granular material 10 appearing at container aperture 4 and the periphery (surface) of shaft 2 is situated such that no granular material 10 flows over the apex of the shaft when it is stationary. In other words, the maximum angle of respose for the granular material always intersects the shaft below its apex (i.e. topmost center). Shaft 2 may, if desired, include a roughened or serrated surface at its periphery so that when rotated, greater friction develops between the shaft and granular material 10 when conveying the granular material appearing at ports 4 over the surface of the shaft. A drive 3 controls the rotational rate of shaft 2 so that it can be rotated at any desired rotational rate including intermittant rotation. For a given slide 5 position, the rotational rate of shaft 2 determines the overall rate at which granular material 10 is delivered to the points of consumption.

Opposite each container port 4, on the other side of shaft 2 is a trough 6 for receiving granular material 10 conveyed over the surface of the shaft during its rotation, one such trough for each container port. Granular material 10 flowing into a trough 6 is collected into one of a plurality of feed tubes 7, one such supply pipe associated with each trough. Each feed tube 7 is coupled into an air injector 8 receiving an air flow from an air manifold 9 coupled to an air source. Air injectors 8 are positioned below feed tubes 8 and troughs 6 so that granular material 10 feeds by the action of gravity into the air injectors. Granulate 10 collected in a trough 6 flows by the action of gravity through a supply pipe 7 and into an air injector 8 where it is entrained in an air stream supplied by air manifold 9. By regulating the air pressure within manifold 9, the air-granulate mixture developed within air injector 8 is controlled. The output of each air injector 8 is coupled via a pipe 11 to a point of consumption, usually the burner of a furnace.

The overall rate of delivery of granular material 10 is determined by the speed of rotation of shaft 2. Thus, the rate of delivery of granular material 10 to the various points of consumption is controlled by varying the speed of rotation of shaft 2. The relative rates of delivery to the various points of consumption are controlled by adjustment of the respective cross-sectional areas of container ports 4 by operation of slides 5. In this manner, the rate of delivery of granular material to any particular point of consumption can be controlled independently from the rate of delivery of granular material to any other particular point of consumption.

Thus, exemplary apparatus for the independently regulated distribution of granular material 10 to a plurality of points of consumption is disclosed including:

a container 1 having a plurality of container ports 4;

slides 5 for controlling the size of these container ports;

a rotatable shaft 2 positioned laterally along these container ports and positioned close enough to these ports so as to convey by friction granular material flowing through these ports; and troughs 6 corresponding to each container port positioned so as to gather granular material conveyed by the rotating shaft from the corresponding container aperture and a plurality of air injectors 8, one such injector associated with each trough for entraining the granular material conveyed over the shaft into an air stream for distribution to points of consumption.

The rotatable shaft 2 extends parallel to the bottom longitudinal edge of container 1 and is rotated such that the apex of the shaft rotates away from the container. Granular material 10 appearing at ports 4 by the action of gravity feed is stopped by the presence of shaft 2 when the shaft is not rotating and is conveyed by the shaft when it is rotating by the action of friction between the particles of granulate and the surface of the shaft. The rate of granular material flow is determined by the speed of rotation of the shaft and the size of the individual container ports. By adjusting slides 5 associated with each container port 4, the relative granular material flow rates to individual points of consumption can be controlled.

In addition, an exemplary method for the independently regulated distribution of granulate 10 to a plurality of points of consumption is disclosed, the method including the steps of:

storing granular material to be distributed within a container having a plurality of ports therein, the size of these ports being controllable;

rotating a shaft in the vicinity of these ports;

conveying granular material along the surface of the shaft;

receiving the granular material conveyed over the surface of the shaft into a plurality of troughs corresponding to the plurality of container ports; and conducting the granular material at each such trough through an air injector mechanism to a distribution pipe for conduction to a plurality of points of consumption.

According to this method, the rate of delivery of granular material 10 is determined by the position of the shaft 2 with respect to container ports 4, its rate of rotation and the absolute and relative sizes of the container ports themselves.

By way of a specific, non-limitative but typical example, in an apparatus and according to the method of the present invention, coal granulate is the granular material being distributed to a plurality of coal burning furnaces. The diameter of shaft 2 is two (2) inches and the rate of rotation of the shaft is 0–100 RPM. For a maximum flow of 20 lbs. of coal per hour per burner, all conduits (feed tubes 7, pipes 11) are at least ¾ inch in diameter. The opening size of ports 4 is determined by capacity, type of coal granulate and the angle of repose of the coal granulate at the ports.

As an additional non-limitative example, when the apparatus according to the present invention is used for granulate coal distribution to a tunnel kiln, the rotational rate of shaft 2 is 0–60 RPM. Air pressure to air injectors 8 is 10–16 oz. The rate of coal delivery is from 0–20 lbs. per burner per hour for coal granulate particle sizes up to ⅛ inch in diameter. Feed rate, controlled by the rotational rate of shaft 2 is dependent upon the temperature desired within the kiln.

When the present invention is applied to the delivery of granular coal to a coal burner furnace, there is defined a method for the temperature regulation of the furnace including the steps of:

storing granular coal within a container having at least one port therein, the size of said port being adjustable;

rotating a metering roller in the vicinity of said port outside of said container so as to convey granular coal over the surface of the roller;

entraining the granular coal conveyed over the surface of the roller into an air stream creating a coal/air mixture; and conducting the coal/air mixture to a burner, whereby the temperature of the furnace is controlled by the size of the ports and the rate of rotation of the roller.

Therefore, it is apparent that there has been provided an apparatus and a method for the delivery of granular material to a plurality of points of consumption and that this delivery is independently regulated such that the amount of granular material delivered to a particular point of consumption is not dependent on the amount of granular material delivered to any other point of consumption. By controlling the speed of rotation of shaft 2 the overall rate of granular material flow is determined and by controlling the relative positions of slides 5, the relative rates of flow to the various points of consumption are controlled.

The apparatus and method disclosed are not limited to the distribution of granulate coal to a plurality of furnaces but rather are applicable to the regulated distribution of any granular material. Other embodiments and modifications of the present invention will be apparent to those of ordinary skill in the art having the benefit of the teachings presented in the foregoing description and drawings.

For example, other gases could be substituted for air in distribution pipe 9. The surface of shaft 2 could be modified to convey more or less granular material as desired by creating an array of detents or scoops. It is, therefore, to be understood that this invention is not to be unduly limited and that such modificcations are intended to be included within the scope of the appended claims.

What is claimed is:

1. Apparatus for the regulated distribution of granular material to plural points of consumption comprising:

a container for holding said granular material to be distributed, said container including plural ports therein one corresponding to each point of consumption through which said granular material can pass and plural adjustable members one such member associated with each of said ports for controlling the size thereof;

a single shaft rotatably mounted longitudinally with respect to said ports and positioned proximate thereto and adapted such that when rotated said shaft comes into contact with and conveys said granular material at said ports away from said ports, said single shaft being sized and positioned relative to said ports so as to effectively control as a function of the speed of rotation of shaft rotation, the respective rates at which said granular material passes thereover;

plural means, one such means associated with each of said ports, for receiving said granular material from their corresponding port so conveyed by said shaft for conveyance to corresponding points of consumption; and a plurality of gas injectors, one such gas injector associated with each of said means for receiving and each of said plural points of consumption, for mixing the granular material from its associated means for receiving with a stream of gas and feeding the resulting mixture to its associated point of consumption, whereby the overall feeding rate of granular material to all points of consumption is controlled by controlling the rotation of said single shaft and the ratio of granular material distributed among all points of consumption is controlled by adjusting the relative sizes of said adjustable members.

2. An apparatus according to claim 1 wherein said ports and shaft are positioned such that granular material is forced by gravity through said ports at a certain angle of repose and makes contact with the circumferential surface of said shaft at a point below its apex such that said granular material cannot spill over said shaft when said shaft is not rotating, whereby the delivery of granular material can be completely stopped by stopping the rotation of said shaft.

3. An apparatus according to claim 1 wherein said means for receiving said conveyed granular material includes a trough positioned below said shaft and longitudinally positioned along said shaft in the vicinity of said port.

4. Apparatus for gas injection feeding individually controllable qualities of supplied coal granulate to each of a plurality of burners comprising:
   a container for holding a supply of said coal granulate;
   said container having plural openings spaced therealong at a lower portion of the container through which corresponding plural streams of said coal granulate may fall;
   each of said openings including an adjustable member which is adjustable so as to control the effective size of its respectively associated opening and thereby to individually control the relative quantities of coal granulate passing through said openings in said streams;
   a single rotatable shaft disposed in front of said openings such that its top surface moves away from said openings during rotation, said shaft being sized and positioned relative to said openings so as to effectively control as a function of the speed of shaft rotation, the respective rates at which said coal granulate passes thereover from said streams;
   a separate outlet passageway associated with each of said streams, disposed to collect its respective stream of coal granulate after passage over said shaft; and
   a plurality of injectors, one such injector associated with each of said outlet passageways and a single burner, for mixing the coal granulate passing therethrough with a stream of gas and feeding the resulting mixture to its associated burner, whereby thereover all magnitude of coal granulate flow to all burners can be controlled by controlling the rotation of said rotatable shaft and the ratio of coal granulate distributed among said burners can be controlled by adjusting the relative sizes of said openings by adjusting said adjustable members.

5. Apparatus as in claim 4 wherein said shaft is sized and positioned relative to said openings so as to prevent the passage of said coal granulate thereover unless said shaft is being rotated.

6. Apparatus as in claim 4 or 5 wherein said shaft is roughened or serrated about its circumference in the area of each of said openings.

7. Apparatus as in claim 4 or 5 further including means for rotating said shaft either continuously or intermittently.

8. Apparatus as in claim 7 wherein said shaft is roughened or serrated about its circumference in the area of each of said openings.

9. Apparatus as in claim 4 or 5 including means for rotating said shaft continuously whereby the coal granulate is supplied continuously to said burners.

10. Apparatus as in claim 9 wherein said shaft is roughened or serrated about its circumference in the area of each of said openings.

11. Apparatus as in claim 4 or 5 including means for rotating said shaft intermittently whereby the coal granulate is supplied intermittently to said burners.

12. Apparatus as in claim 11 wherein said shaft is roughened or serrated about its circumference in the area of each of said openings.

13. A method for distributing individually controllable quantities of supplied granular material to each of a plurality of consuming stations comprising the steps of:
   holding a supply of the granular material within a container having plural adjustable openings spaced therealong at a lower portion of the container through which corresponding plural streams of granular material may fall;
   rotating a single shaft disposed in front of the openings such that its top surface moves away from the openings during roation, the shaft being sized and positioned relative to the openings so as to effectively control as a function of the speed of shaft rotation, the respective rates at which the granular material passes thereover from the streams;
   collecting into separate outlet passageways, one associated with each of the streams, granular material carried by the single rotating shaft;
   injecting the granular material collected into each outlet passageway into an air stream for conveyance to a single consuming station associated therewith.

14. Apparatus for the regulated distribution of granulate to plural points of consumption comprising:
   a container for holding said granulate to be distributed, said container including a port therein corresponding to each of said points of consumption through which said granulate can pass;
   a slide associated with each port for regulating the size of said port;
   a single shaft movably mounted such that its longitudinal axis is substantially perpendicular to the direction in which said granulate is forced due to gravity and close enough to all of said ports so as to convey granulate from each of said ports;
   a receiving trough positioned below said shaft and longitudinally along said shaft in the vicinity of said port for collecting granulate from each of said ports and conveyed by said single shaft without mixing granulate from any two ports;
   plural supply pipe elements coupled to said receiving trough one such supply pipe element associated with each of said ports for conducting said granulate away from said receiving trough;
   an air injector coupled to each of said supply pipes for entraining the graulate from a single port associated therewith into an air stream; and
   a delivery pipe member coupled to each of said air injectors for conducting said entrained granulate to the point of consumption associated with said air injector.

15. Apparatus for the feeding of coal granulate to burners comprising:
   a storage container for receiving said coal granulate to be fed;
   injectors for mixing said coal granulate with air, one such injector associated with each of said burners; and
   a metering device in the flow of said coal granulate between said storage container and said injectors including:
      a roller located parallel to a lower longitudinal edge of said storage container, rotatable away from said container with its upper side, continuously or intermittently driven, said container being provided with a number of openings therein corresponding to the number of burners to be fed, each of said openings fitted with a gate for adjusting the size thereof, whereby in the widest open position of said gates the intersection of the angle of repose of the free flowing granulate with the circumference of the roller is at the apex of the roller, and a funnel pipe associated with each opening for receiving granulate flowing therethrough and carried by said roller and conveying said granulate to its associated air injector.

16. Apparatus according to claim 15 wherein said roller has a serrated surface.

17. Apparatus for metering and air injection feeding coal granulate to a plurality of burners comprising:

a storage container for holding said coal granulate, said container including a port therein corresponding to each of said burners to be fed, said ports spaced along a lower portion of said container through which ports corresponding plural streams of said coal granulate may fall;

a gate positioned at each of said ports which is adjustable so as to control the effective size of its respectively associated port to individually control the relative quantities of coal granulate passing therethrough;

a single rotatable shaft disposed in front of said ports such that its top surface moves away from said openings during rotation, said shaft being sized and positioned relative to said ports so as to effectively control as a function of the speed of shaft rotation, the respective rates at which said coal granulate passes thereover from said streams;

a separate outlet passageway associated with each of said streams, disposed to collect its respective stream of coal granulate after passage over said shaft; and a plurality of injectors, one such injector associated with each of said outlet passageways and a single burner, for mixing the coal granulate passing therethrough with a stream of air and feeding the resulting mixture to its associated burner, whereby the overall magnitude of coal granulate flow to all burners can be controlled by controlling the rotation of said rotatable shaft and the ratio of coal granulate distributed among said burners can be controlled by adjusting the relative sizes of said openings by adjusting said adjustable members.

* * * * *